US009207486B2

United States Patent
Inoue et al.

(10) Patent No.: US 9,207,486 B2
(45) Date of Patent: Dec. 8, 2015

(54) LIQUID CRYSTAL DISPLAY APPARATUS COMPRISING A LIGHT SHIELDING LAYER OVERLAPPING OUTERMOST CONDUCTIVE PATTERNS OF AN ELECTRODE

(71) Applicant: Samsung Display Co., Ltd., Yongin, Gyeonggi-Do (KR)

(72) Inventors: Daisuke Inoue, Cheonan-si (KR); Mi-Suk Kim, Cheonan-si (KR); Tae-Ho Kim, Asan-si (KR); So-Youn Park, Suwon-si (KR); Da-Hye Cho, Hwaseong-si (KR); Keun-Chan Oh, Cheonan-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 189 days.

(21) Appl. No.: 13/857,388

(22) Filed: Apr. 5, 2013

(65) Prior Publication Data
US 2014/0146277 A1    May 29, 2014

(30) Foreign Application Priority Data

Nov. 29, 2012 (KR) .................. 10-2012-0136723

(51) Int. Cl.
G02F 1/1343  (2006.01)
G02F 1/1333  (2006.01)
G02F 1/1335  (2006.01)

(52) U.S. Cl.
CPC .... *G02F 1/133512* (2013.01); *G02F 1/133514* (2013.01)

(58) Field of Classification Search
USPC .................................................. 349/110, 141
See application file for complete search history.

(56) References Cited

U.S. PATENT DOCUMENTS

| 6,341,003 | B1 * | 1/2002 | Ashizawa et al. ............. 349/141 |
| 6,747,712 | B2 | 6/2004 | Noh et al. | |
| 2001/0048501 | A1 * | 12/2001 | Kim et al. .................... 349/141 |
| 2009/0103035 | A1 * | 4/2009 | Suzuki et al. ................. 349/141 |
| 2012/0081626 | A1 * | 4/2012 | Itoh et al. ....................... 349/33 |

FOREIGN PATENT DOCUMENTS

| JP | WO2011001716 | * | 1/2011 |
| KR | 1020020069570 A | | 9/2002 |
| KR | 1020040054425 A | | 6/2004 |
| KR | 1020040060701 A | | 7/2004 |

* cited by examiner

*Primary Examiner* — Paul Lee
(74) *Attorney, Agent, or Firm* — Cantor Colburn LLP

(57) ABSTRACT

A liquid crystal display apparatus includes a first substrate, a first electrode on the first substrate, a second electrode overlapping the first electrode and including a plurality of conductive patterns elongated in a first direction, and a light shielding layer overlapping an outermost conductive pattern of the second electrode.

18 Claims, 11 Drawing Sheets

LIQUID CRYSTAL DISPLAY APPARATUS COMPRISING A LIGHT SHIELDING LAYER OVERLAPPING OUTERMOST CONDUCTIVE PATTERNS OF AN ELECTRODE

This application claims priority to Korean Patent Application No. 10-2012-0136723, filed on Nov. 29, 2012, and all the benefits accruing therefrom under 35 U.S.C. §119, the contents of which are herein incorporated by reference in their entireties.

BACKGROUND

1. Field

Exemplary embodiments of the invention relate to a liquid crystal display apparatus. More particularly, exemplary embodiments of the invention relate to a liquid crystal display apparatus having a light shielding layer.

2. Description of the Related Art

Generally, a liquid crystal display ("LCD") apparatus includes a LCD panel which includes a display substrate, an upper substrate facing the display substrate, and a liquid crystal layer interposed between the display substrate and the upper substrate. A plurality of signal lines and a plurality of thin film transistor are disposed on the display substrate.

Generally, the LCD panel uses a twisted nematic ("TN") mode. The LCD panel may also use a plane to line switching ("PLS") mode in order to ensure a wide viewing angle of the LCD apparatus.

A LCD panel of the PLS mode includes a pixel electrode, and a common electrode overlapped with the pixel electrode. An electric field applied between the pixel electrode and the common electrode spins liquid crystal molecules, to represent a gray scale.

SUMMARY

One or more exemplary embodiment of the invention provides a liquid crystal display apparatus minimizing flicker and an afterimage, and having an improved display quality.

According to an exemplary embodiment of the invention, a liquid crystal display apparatus includes a first substrate, a first electrode on the first substrate, a second electrode overlapping the first electrode and including a plurality of conductive patterns elongated in a first direction and spaced apart from each other in a second direction which crosses the first direction, and a light shielding layer overlapping an outermost conductive pattern of the second electrode in the second direction.

In an exemplary embodiment, the liquid crystal display apparatus may further include an insulation layer between the first electrode and the second electrode. The first electrode may include a common electrode, and the second electrode may include a pixel electrode.

In the exemplary embodiment, the pixel electrode and the insulation layer may be satisfied a following equation:

$$-0.16 \times T + 0.38 \leq L/P \leq -0.16 \times T + 0.48,$$

where T is a cross-sectional thickness of the insulation layer, L is a second direction width of a conductive pattern and P is a pitch of the conductive patterns. The pitch is a distance between centers of two adjacent conductive patterns.

In the exemplary embodiment, the liquid crystal display apparatus may further include a data line on the first substrate, and the light shielding layer may include the data line.

In the exemplary embodiment, the liquid crystal display apparatus may further include a gate line on the first substrate, and the light shielding layer and the gate line may include a same material.

In the exemplary embodiment, the light shielding layer and the gate line may be in a same layer.

In the exemplary embodiment, the liquid crystal display apparatus may further include a second substrate facing the first substrate and including a color filter. The light shielding layer may be on the second substrate.

In the exemplary embodiment, the light shielding layer may include a black matrix.

In the exemplary embodiment, a total second direction width of the outermost conductive pattern overlapped by the light shielding layer may be the same as a second direction width of one conductive pattern.

In the exemplary embodiment, an edge of the light shielding layer overlapping the outermost conductive pattern may correspond with a center line elongated in the first direction and passing through a center of the outermost conductive pattern in a plan view.

In another exemplary embodiment of a liquid crystal display apparatus according to the invention, the a liquid crystal display apparatus includes a first substrate, a first electrode on the first substrate, a second electrode overlapping the first electrode and including a plurality of bent conductive patterns elongated in a first direction and spaced apart from each other in a second direction which crosses the first direction, and a light shielding layer overlapping an outermost conductive pattern of the second electrode in the second direction.

In the exemplary embodiment, the liquid crystal display apparatus may further include an insulation layer between the first electrode and the second electrode. The first electrode may include a common electrode, and the second electrode may include a pixel electrode.

In the exemplary embodiment, the pixel electrode and the insulation layer may be satisfied a following equation:

$$-0.16 \times T + 0.38 \leq L/P \leq -0.16 \times T + 0.48,$$

where T is a cross-sectional thickness of the insulation layer, L is a second direction width of a conductive pattern, and P is a pitch of the conductive patterns. The pitch is a distance between centers of two adjacent conductive patterns.

In the exemplary embodiment, the liquid crystal display apparatus may further include a data line on the first substrate, and the light shielding layer may include the data line.

In the exemplary embodiment, the liquid crystal display apparatus may further include a gate line on the first substrate, and the light shielding layer and the gate line may include a same material.

In the exemplary embodiment, the light shielding layer and the gate line may be in a same layer.

In the exemplary embodiment, the liquid crystal display apparatus may further include a second substrate facing the first substrate and having a color filter. The light shielding layer may be on the second substrate.

In the exemplary embodiment, the light shielding layer may include a black matrix.

In the exemplary embodiment, a total second direction width of the outermost conductive pattern overlapped by the light shielding layer may be the same as a second direction width of one conductive pattern.

In the exemplary embodiment, an edge of the light shielding layer overlapping the outermost conductive pattern may correspond with a center line elongated in the first direction and passing through a center of the outermost conductive pattern in a plan view.

According to one or more exemplary embodiment of the liquid crystal display apparatus, the light shielding layer overlaps the conductive pattern corresponding to the edge of the pixel electrode, so that a number of conductive patterns of the pixel electrode and a number of slits between the conductive patterns are the same. Therefore, a difference of a luminance between a positive frame and a negative frame may be minimized, and a flicker may be minimized. When the flicker is minimized, a display quality of the liquid crystal display apparatus may be improved.

In addition, the light shielding layer shields an outside of an external electrode, so that the afterimage may be minimized. Therefore, a display quality of the liquid crystal display apparatus may be improved.

BRIEF DESCRIPTION OF THE DRAWINGS

The above and other features of the invention will become more apparent by describing in detail exemplary embodiments thereof with reference to the accompanying drawings, in which.

DETAILED DESCRIPTION

Figure 1:
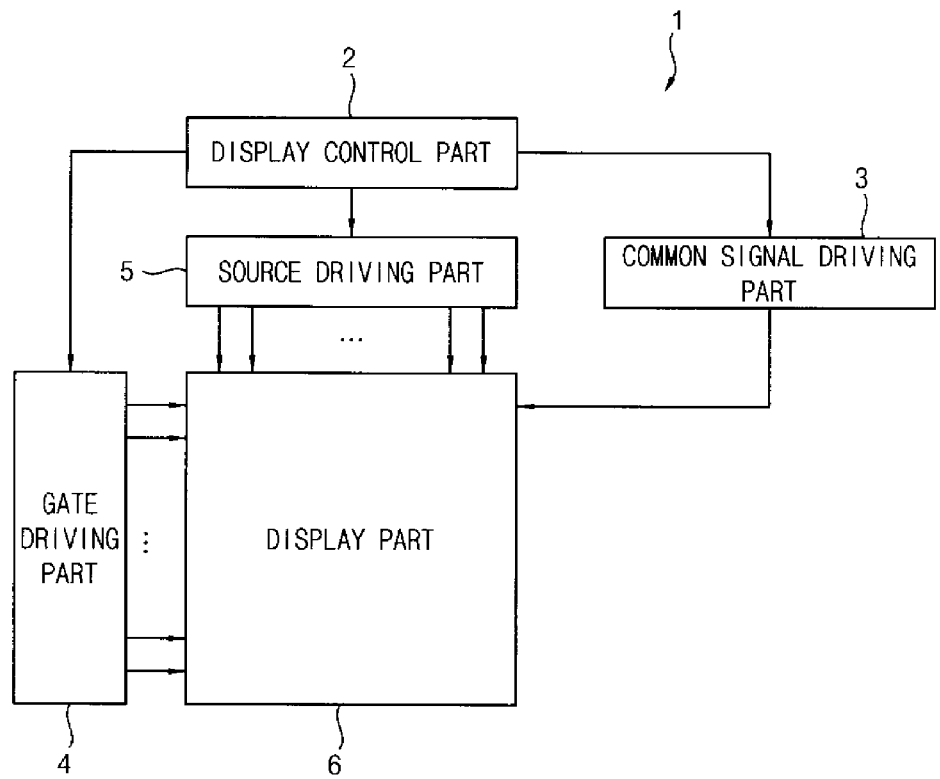
FIG. 1 is a block diagram illustrating an exemplary embodiment of a liquid crystal display apparatus according to the invention.

It will be understood that when an element or layer is referred to as being "on" or "connected to" another element or layer, the element or layer can be directly on or connected to another element or layer or intervening elements or layers. In contrast, when an element is referred to as being "directly on" or "directly connected to" another element or layer, there are no intervening elements or layers present. As used herein, connected may refer to elements being physically and/or electrically connected to each other. Like numbers refer to like elements throughout. As used herein, the term "and/or" includes any and all combinations of one or more of the associated listed items.

It will be understood that when an element or layer is referred to as being "on," "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. As used herein, connected may refer to elements being physically and/or electrically connected to each other.

Spatially relative terms, such as "lower," "under," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "under" or "lower" relative to other elements or features would then be oriented "above" relative to the other elements or features. Thus, the exemplary term "under" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention will be explained in detail with reference to the accompanying drawings.

Where an electrode structure within a liquid crystal display ("LCD") panel is of a wedge type, a polarization is generated due to a splay deformation and a bending deformation. This phenomenon is known as a flexsoelectric effect. Generally, the flexsoelectric effect occurs when a liquid crystal cell is deformed. However, for the LCD panel in a plane to line switching ("PLS") mode, a macroscopic polarization may occur due to a splay deformation or a bending deformation. The macroscopic polarization occurs due to the flexsoelectric effect.

Driving of a LCD apparatus may use an alternating current in order to prevent a deterioration of liquid crystal material in the LCD panel. In the alternating current driving process, a polarity of voltages of a pixel electrode and a polarity of voltages of a common electrode are inverted at regular intervals. However, a polarity of polarization due to the flexsoelectric effect is not inverted, so that an optical transmittance of each pixel is different. Particularly, when the alternating current driving process is performed in order to invert a polarity, an optical transmittance between a positive frame and a negative frame is different. Therefore, a luminance of the LCD apparatus is different in the each frame, so that a flicker and an afterimage undesirably occur to deteriorate an image display quality.

FIG. 1 is a block diagram illustrating an exemplary embodiment of a liquid crystal display apparatus according to the invention.

Referring to FIG. 1, an exemplary embodiment of a liquid crystal display apparatus 1 according to the invention includes a display control part 2, a common signal driving part 3, a gate driving part 4, a source driving part 5 and a display part 6.

The display control part 2 stores and maintain a picture signal for each frame in a frame memory including static random access memory ("SRAM") and the like. The display control part 2 controls the common signal driving part 3, the gate driving part 4 and the source driving part 5 to drive the display part 6. In particular, the display control part 2 provides a common signal timing control signal and a scan timing control signal to the common signal driving part 3 and the gate driving part 4, respectively. The display control part 2 provides a picture signal of one horizontal line and a display timing control signal to the source driving part 5.

The common signal driving part 3 serves as a circuit for providing a common signal to the display part 6 according to the common signal timing control signal provided from the display control part 2. In an exemplary embodiment of the invention, the display part 6 may be operated by frame inversion driving. That is, the common signal driving part 3 inverts a polarity of the common signal, and outputs the common signal to the display part 6.

The gate driving part 4 selects a pixel among a plurality of pixels in the display part 6 according to the scan timing control signal provided from the display control part 2. The gate driving part 4 applies a scan signal to a gate of a transistor of the pixel through a gate line GL, so that pixels in one line are selected among the plurality of pixels to be display-driven. The selected pixels display one horizontal line according to a pixel signal provided from the source driving part 5. Therefore, the gate driving part 4 scans the plurality of pixels in the display part 6 sequentially by units of one horizontal line, such as to generate a display over an entire display surface of the display part 6.

The source driving part 5 serves as a circuit for providing the picture signal of one horizontal line provided from the display control part 2 to each pixel of the display part 6 as the pixel signal. The source driving part 5 provides the pixel signal to pixels in the one horizontal line selected by the gate driving part 4 through a data line DL.

Figure 2:
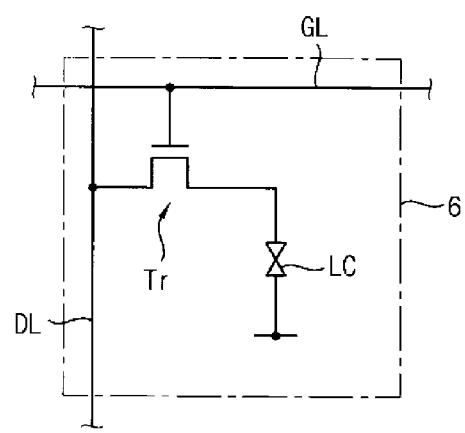
FIG. 2 is a circuit diagram illustrating an exemplary embodiment of a pixel in a display part of FIG. 1.

FIG. 2 is a circuit diagram illustrating an exemplary embodiment of a pixel in the display part of FIG. 1.

The display part may include a display panel. Referring to FIG. 2, the display part 6 includes a plurality of pixels arranged in a matrix shape. Each pixel includes a transistor TR and a liquid crystal element LC. The transistor may include a thin film transistor, but is not limited thereto or thereby. The transistor TR includes a source electrode connected to the data line DL, a gate electrode connected to the gate line GL and a drain electrode connected to a first end of the liquid crystal element LC through a pixel electrode. The first end of the liquid crystal element LC is connected to the drain electrode of the transistor TR through the pixel electrode. An opposing second end of the liquid crystal element LC is connected to common electrode, so that a common signal is provided to the liquid crystal element LC by the common signal driving part 3.

The pixel is connected to another pixel of a same line in the display part 6 by the gate line GL. The gate line GL is connected to the gate driving part 4. The gate driving part 4 provides a scan signal to the gate line GL. The pixel is connected to another pixel of a same column in the display part 6 by the data line DL. The data line DL is connected to the source driving part 5. The source driving part 5 provides a pixel signal to the data line DL.

Figure 3:
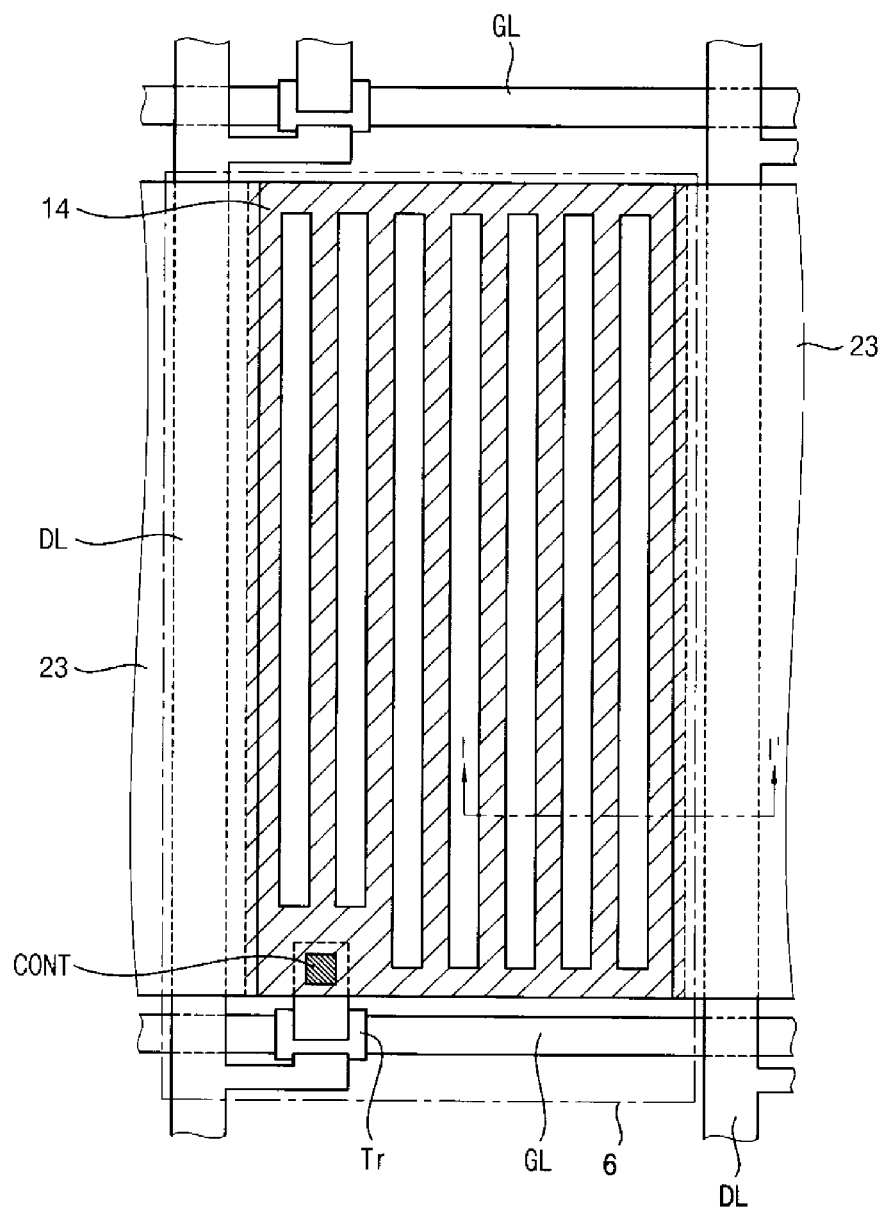
FIG. 3 is a plan view illustrating an exemplary embodiment of a display part according to the invention.
Figure 4:
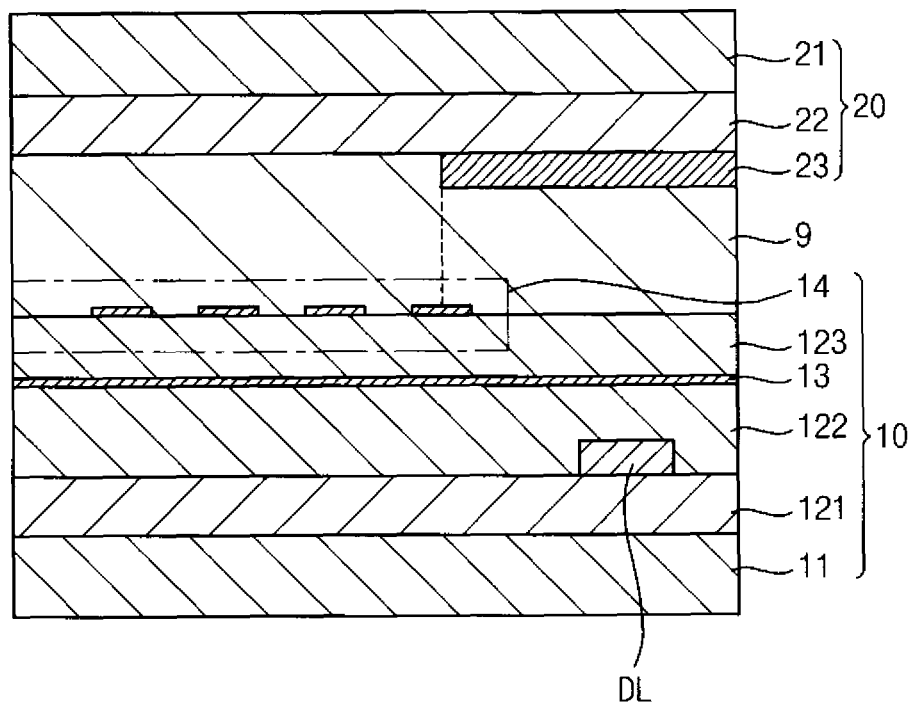
FIG. 4 is a cross-sectional view taken along line I-I' of FIG. 3.

FIG. 3 is a plan view illustrating an exemplary embodiment of a display part according to the invention. FIG. 4 is a cross-sectional view taken along line I-I' of FIG. 3.

Referring to FIGS. 3 and 4, an exemplary embodiment of the display part 6 according to the invention includes a pixel electrode 14, and a black matrix 23 as a light shielding layer which partially overlaps with the pixel electrode 14. The pixel electrode 14 may include a transparent conductive material, such as indium tin oxide ("ITO"), but is not limited thereto or thereby. The pixel electrode 14 is a transparent electrode.

The pixel electrode 14 includes a plurality of conductive patterns that are connected with one another at both of opposing ends of the conductive patterns. The pixel electrode 14 includes portions which are elongated to extend in a first direction and a second direction. The first direction is substantially parallel with a long axis of the gate line GL. The second direction is substantially parallel with a long axis of the data line DL. The conductive patterns are spaced apart from one another in the first direction. The conductive patterns are elongated to extend in the second direction, and a width of one conductive pattern is taken perpendicular to an elongation direction thereof, such being taken in the first direction.

A slit is defined between adjacent conductive patterns. The slit is elongated to extend in the second direction, and a width of the slit is taken perpendicular to an elongation direction thereof, such being taken in the first direction. A plurality of slits is spaced apart from one another in the first direction.

The pixel electrode 14 and the transistor TR are connected with each other through a contact part CONT. The black matrix 23 is elongated to extend in the second direction, and a width of the black matrix 23 is taken perpendicular to an elongation direction thereof, such being taken in the first direction. The black matrix 23 is partially overlapped with one or more of the outermost conductive pattern of the pixel electrode 14 corresponding to an edge of the pixel electrode 14. In one exemplary embodiment, for example, an end portion or edge of the black matrix 23 is arranged at substantially a center of the outermost conductive pattern of the pixel electrode 14, with respect to the first direction.

The black matrix 23 is disposed between adjacent pixel electrodes 14 and partially overlapped with both of the adjacent pixel electrodes 14. In one exemplary embodiment, for example, both of opposing end portions (e.g., edges) of the black matrix 23 in the first direction are disposed at substantially a center of an outermost conductive pattern of the adjacent pixel electrodes 14.

A common electrode 13 is disposed substantially on an entirety of the pixel electrodes 14, and may be a layer disposed under the pixel electrodes 14, as illustrated in FIG. 4. The common electrode 13 may include a transparent conductive material, such as ITO. The common electrode 13 is a transparent electrode.

Referring to FIG. 4, the display part 6 includes a first (lower) substrate 10, a second (upper) substrate 20 and a liquid crystal layer 9. The first substrate 10 is an array substrate and includes a first base substrate 11, a first insulation layer 121, the data line DL, a second insulation layer 122, the common electrode 13, a third insulation layer 123 and the pixel electrode 14 that are sequentially stacked on one another. The second substrate 20 is a color substrate and faces the first substrate 10. The second substrate 20 includes a second base substrate 21, a color filter layer 22 and the black matrix 23. The liquid crystal layer 9 is disposed between the first substrate 10 and the second substrate 20.

The first insulation layer 121 is disposed on the first base substrate 11. The data line DL is disposed on the first insulation layer 121. The second insulation layer 122 is disposed on the first insulation layer 121 and the data line DL. The common electrode 13 is disposed on the second insulation layer 122. The third insulation layer 123 is disposed on the common electrode 13. The pixel electrode 14 is disposed on the third insulation layer 123. The common electrode 13 and the pixel electrode 14 are in different layers of the display panel and/or the liquid crystal display apparatus. As illustrated in FIG. 4, the common electrode 13 and the pixel electrode 14 are overlapped with each other, and are insulated from each other by the third insulation layer 123.

The second substrate 20 includes the second base substrate 21, the color filter layer 22 and the black matrix 23. In an embodiment, the color filter layer 22 may include a plurality of filters of three colors, such as red, green and blue. The color filters 22 of three colors are periodically arranged. The black matrix 23 is disposed to block light in a light-shielded region of the liquid crystal display apparatus. The light-light shielded region may be a region except for an opening of the liquid crystal display apparatus through which light is transmitted. The black matrix 23 reduces or effectively prevents light transmitting through the color filters 22 of three colors from mixing with each other. The black matrix 23 is disposed under the color filters 22 in FIG. 4. However, in another exemplary embodiment, the black matrix 23 may be disposed above the color filter 22. That is, positions of the black matrix 23 and the color filter 22 may be exchanged in various exemplary embodiments.

Figure 5:
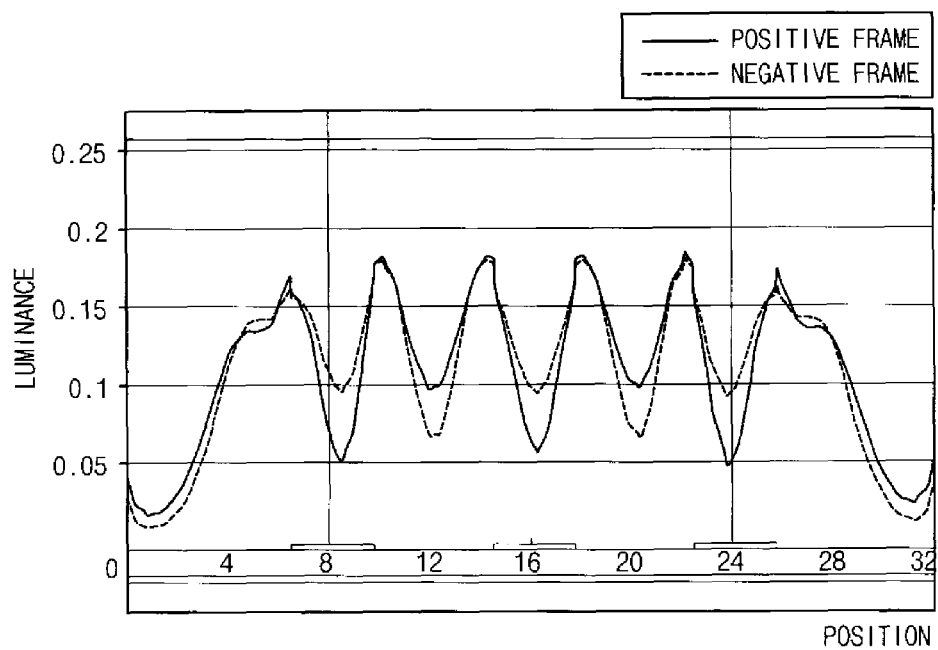
FIG. 5 is a graph illustrating a luminance profile of a positive frame and a negative frame in an exemplary embodiment of a liquid crystal display apparatus according to the invention.

FIG. 5 is a graph illustrating a luminance profile of a positive frame and a negative frame in an exemplary embodiment of a liquid crystal display apparatus according to the invention.

Referring to FIG. 5, a luminance profile of a positive frame and a negative frame in an exemplary embodiment of a liquid crystal display apparatus according to the invention is illustrated. During alternating current driving of the liquid crystal display apparatus, a texture appears on electrodes as a positive frame and slits as a negative frame. When a number of the conductive patterns of the pixel electrode 14 and a number of the slits defined between the conductive patterns are different, a flicker occurs. That is, the flicker occurs due to a luminance difference of the positive frame and the negative frame. Therefore, when the number of the conductive patterns of the pixel electrode 14 and the number of the slits between the conductive patterns are the same, a luminance difference of the positive frame and the negative frame may be minimized and the flicker may be minimized.

Figure 6:
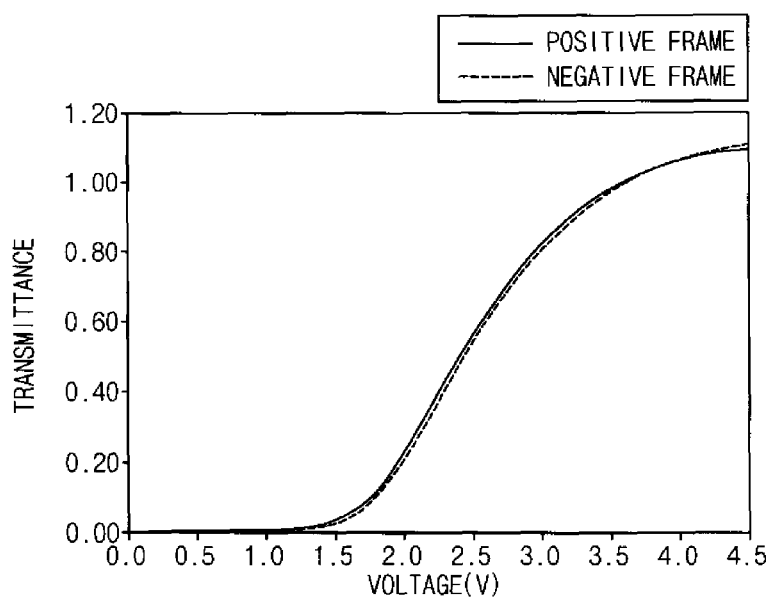
FIG. 6 is a graph illustrating a transmittance according to a voltage in volts (V) when a number of conductive patterns of a pixel electrode and a number of slits between the conductive patterns are the same.

FIG. 6 is a graph illustrating a transmittance according to a voltage in volts (V) when a number of conductive patterns of a pixel electrode and a number of slits between the conductive patterns are the same.

Referring to FIG. 6, when the number of conductive patterns of a pixel electrode and the number of slits defined between the conductive patterns are the same, a transmittance difference according to a voltage is minimized, as illustrated by a negligible separation between the 'POSITIVE FRAME' line and the 'NEGATIVE FRAME' line in FIG. 6. In an exemplary embodiment of a liquid crystal display apparatus according to the invention, an end or edge of the black matrix 23 is disposed at substantially a center of an outermost conductive pattern of the pixel electrode 14, so that when the number of conductive patterns of the pixel electrode 14 and the number of slits defined between the conductive patterns are the same. Therefore, a luminance difference of the positive frame and the negative frame may be minimized and the flicker may be minimized.

In the exemplary embodiment of the liquid crystal display apparatus according to the invention, the end or edge of the black matrix 23 is disposed at substantially a center of the outermost conductive pattern of the pixel electrode 14. Therefore, approximately half of a width of the outermost conductive pattern of the pixel electrode 14 taken in the first direction, is overlapped with the black matrix 23. Where the black matrix 23 is disposed on both of opposing end portions or edges of one pixel electrode 14, the black matrix 23 has two overlapped areas with respect to one pixel electrode 14. That is, since two half-widths of one conductive pattern in the one pixel electrode 14 are overlapped by the black matrix 23, the black matrix 23 effectively overlaps a whole width of the one conductive pattern, so that the number of conductive patterns of a pixel electrode and the number of slits between the conductive patterns are effectively the same.

As illustrated in FIG. 3, the black matrix 23 exposes portions of the conductive patterns of the pixel electrode 14 and slits defined between adjacent conductive patterns. The number of conductive patterns of a pixel electrode and the number of slits between the conductive patterns being the same may be expressed in another way. In one exemplary embodiment, a total exposed first direction width of the conductive patterns in the display part 6 and/or in a pixel of the display part 6 may be the same a total exposed first direction width of the slits defined between adjacent conductive patterns.

However expressed, exemplary embodiments of the invention include a total overlapped width of the pixel electrode 14 and the width of one conductive pattern are the same. Therefore, it is not necessary that an end of the black matrix 23 is disposed at a center of the outermost conductive pattern of the pixel electrode 14. In one exemplary embodiment, for example, when an overlapped width of a left outermost conductive pattern of one pixel electrode 14 by the black matrix 23 is 30%, and an overlapped width of a right outermost conductive pattern of the one pixel electrode by the black matrix 23 is 70%, a total overlapped width of the pixel electrode 14 and the width of one conductive pattern are the same. Accordingly, a luminance difference of the positive frame and the negative frame may be minimized and the flicker may be minimized. When the flicker is minimized, a high display quality of the liquid crystal display apparatus may be realized.

Figure 7:
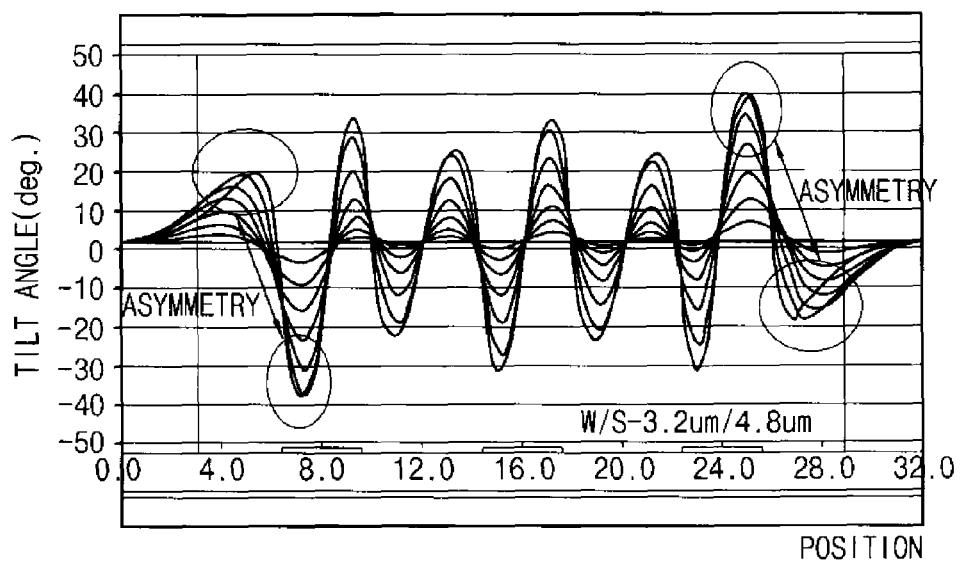
FIG. 7 is a graph illustrating a tilt angle in degrees (deg.) of a liquid crystal of an exemplary embodiment of a liquid crystal display apparatus according to the invention.

FIG. 7 is a graph illustrating a tilt angle in degrees (deg.) of an exemplary embodiment of a liquid crystal of the liquid crystal display apparatus according to the invention.

Referring to FIG. 7, the tilt angle of a liquid crystal is symmetric at a center area of a pixel electrode. The tilt angle of a liquid crystal is asymmetric ('ASYMMETRY') at an outermost area of the pixel electrode. There is an asymmetry of a splay alignment angle at both of opposing ends of the pixel electrode, so that an afterimage appears at both of the opposing ends of the pixel electrode.

In an exemplary embodiment of a liquid crystal display apparatus, an end or edge of the black matrix 23 is disposed at substantially a center of the outermost conductive pattern of the pixel electrode 14. The black matrix 23 is overlapped with the outermost conductive pattern of the pixel electrode 14, so that an outermost area of the pixel electrode 14 is blocked by the black matrix 23. Therefore, the afterimage may be minimized, so that the high quality of the liquid crystal display apparatus may be realized. In the exemplary embodiment of the liquid crystal display apparatus, a total overlapped width of the pixel electrode and the width of one conductive pattern are the same. Therefore, an end or edge of the black matrix 23 need not be disposed at a center of the outermost conductive pattern of the pixel electrode 14. In one exemplary embodiment, for example, when an overlapped width of a left outermost conductive pattern is 30%, and an overlapped width of a right outermost conductive pattern is 70%, a total overlapped width and the width of one conductive pattern are the same.

Figure 8:
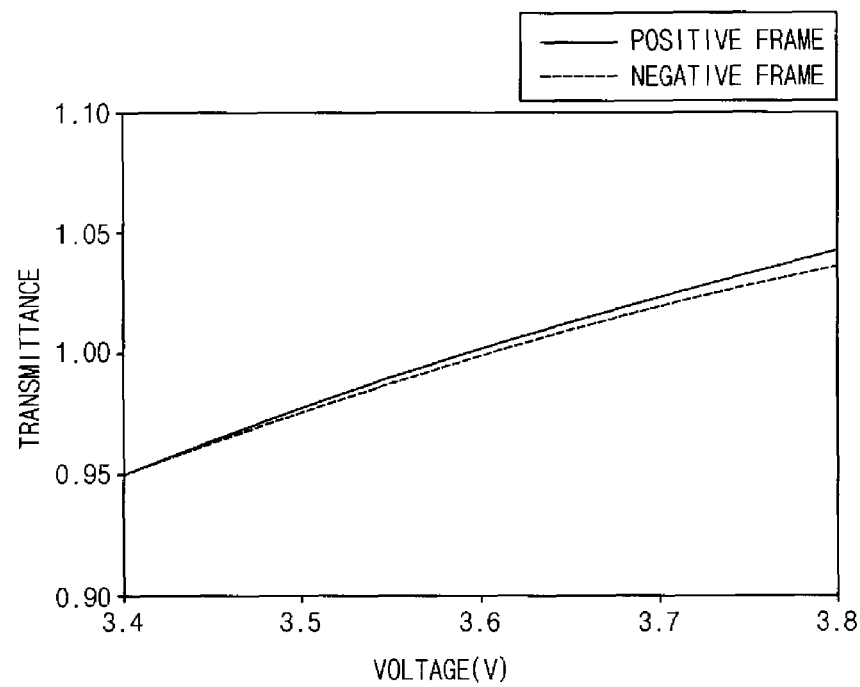
FIG. 8 is a graph illustrating a difference of a luminance when a ratio of a width of a conductive pattern of a pixel electrode to a pitch of the conductive patterns is 0.41.

FIG. 8 is a graph illustrating a difference of a luminance when a ratio of a width (L) of the conductive pattern of the pixel electrode to a pitch (P) of the conductive patterns is 0.41. The pitch is a distance between centers of two adjacent conductive patterns.

Referring to FIG. 8, when T is 2000 angstroms (Å), L is 3.3 micrometers (μm), P is 8.0 μm (where T is a cross-sectional thickness of the second insulation layer 122, and L is a width of the conductive pattern taken in the first direction, and P is a pitch of the conductive patterns), such that L/P is 0.41, a difference of a luminance between a positive frame and a negative frame may be minimized at 3.6 V. That is, when the ratio value of L/P is 0.41, a difference of a luminance between a positive frame and a negative frame may be minimized at about 3.6 V. When a difference of a luminance is minimized, the flicker is minimized.

Figure 9:
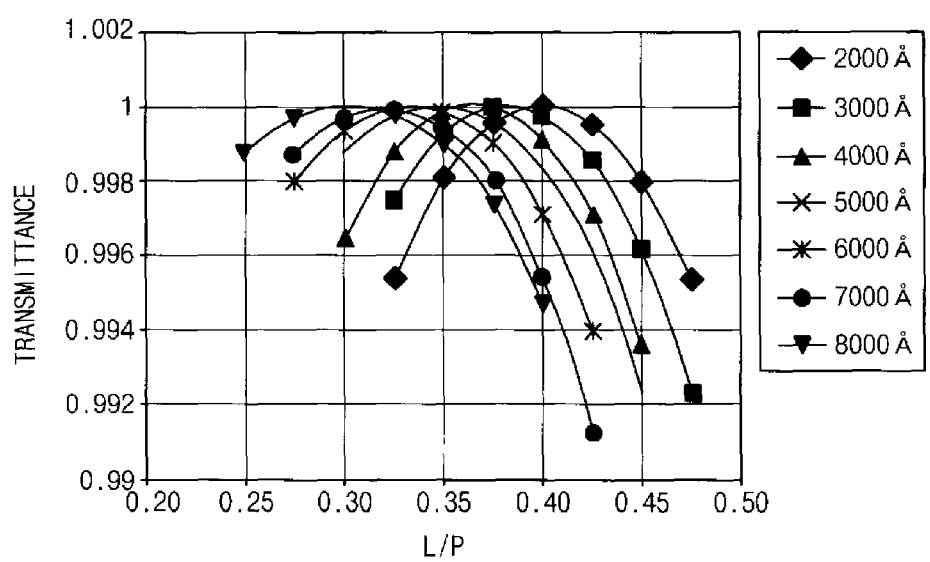
FIG. 9 is a graph illustrating a transmittance according to a ratio of a width of the conductive pattern of a pixel electrode to a pitch of the conductive patterns.

FIG. 9 is a graph illustrating a transmittance according to ratio of a width (L) of the conductive pattern of the pixel electrode to a pitch (P) of the conductive patterns.

Referring to FIG. 9, when L is a width of the conductive pattern, P is a pitch of the conductive patterns, and T is a thickness of the second insulation layer 122, a luminance according to the T and L/P is presented. When T is 2000 Å, L/P is 0.41, a luminance is maximized. Therefore, when the value of L/P is 0.41, the flicker is minimized and the luminance is maximized.

Table 1 illustrates results of measuring the value of T, L and L/P, where the value of P is fixed.

TABLE 1

| T (Å) | L (μm) | L/P |
|---|---|---|
| 2000 | 3.197 | 0.400 |
| 3000 | 3.047 | 0.381 |
| 4000 | 2.917 | 0.365 |
| 5000 | 2.771 | 0.346 |

TABLE 1-continued

| T (Å) | L (μm) | L/P |
|---|---|---|
| 6000 | 2.665 | 0.333 |
| 7000 | 2.564 | 0.321 |
| 8000 | 2.413 | 0.302 |

Referring to Table 1, a relationship between value of T and L/P may be defined by Equation 1.

$$L/P = -0.16 \times T + 0.43 \qquad \text{Equation 1}$$

Referring to FIG. 9, when T is 2000 Å, the value of L/P is the value where transmittance is effectively 1. When transmittance is 0.998, the flicker may be minimized. Therefore, the value of L/P minimizing the flicker may be defined by Equation 2.

$$-0.16 \times T + 0.38 \leq L/P \leq -0.16 \times T + 0.48 \qquad \text{Equation 2}$$

Figure 10:
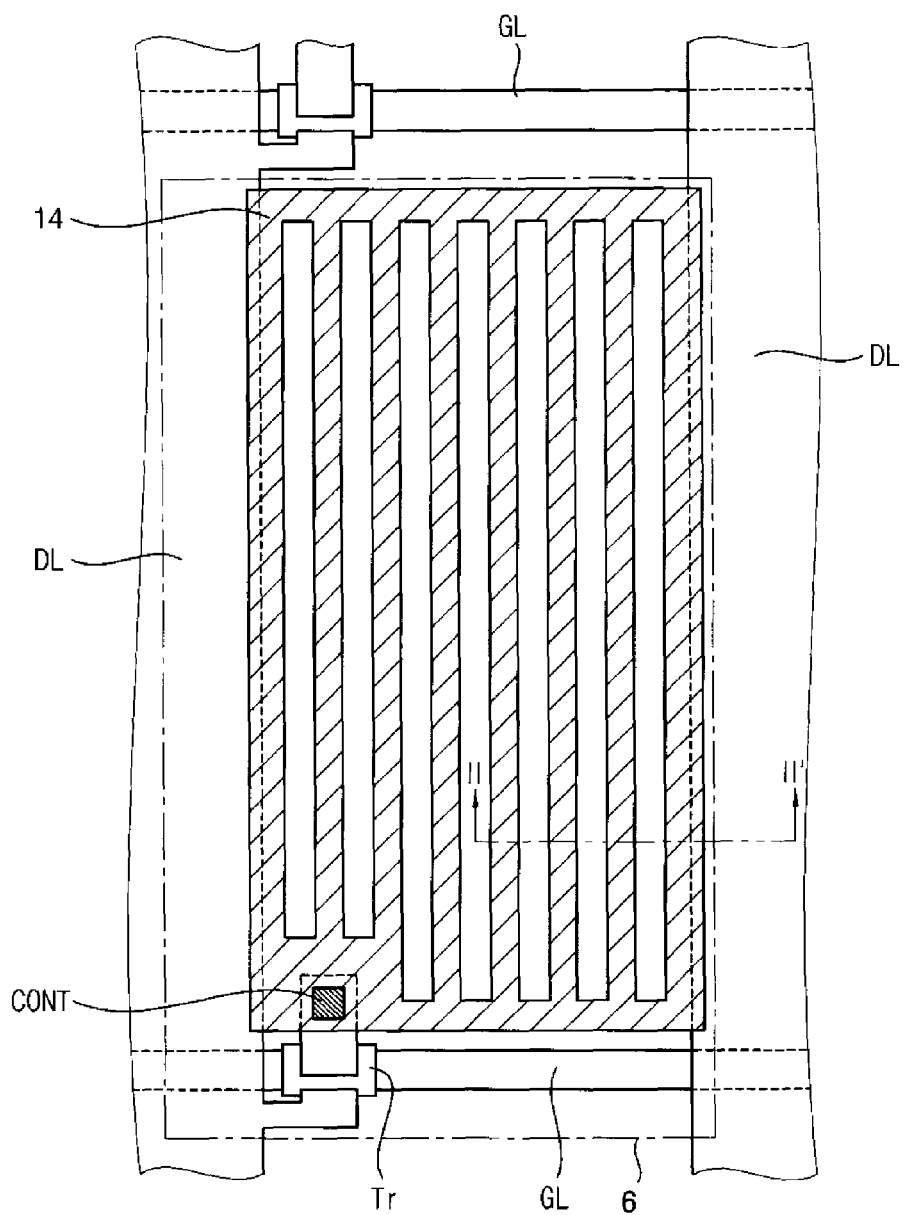
FIG. 10 is a plan view illustrating another exemplary embodiment of a display part of a liquid crystal display apparatus according to the invention.
Figure 11:
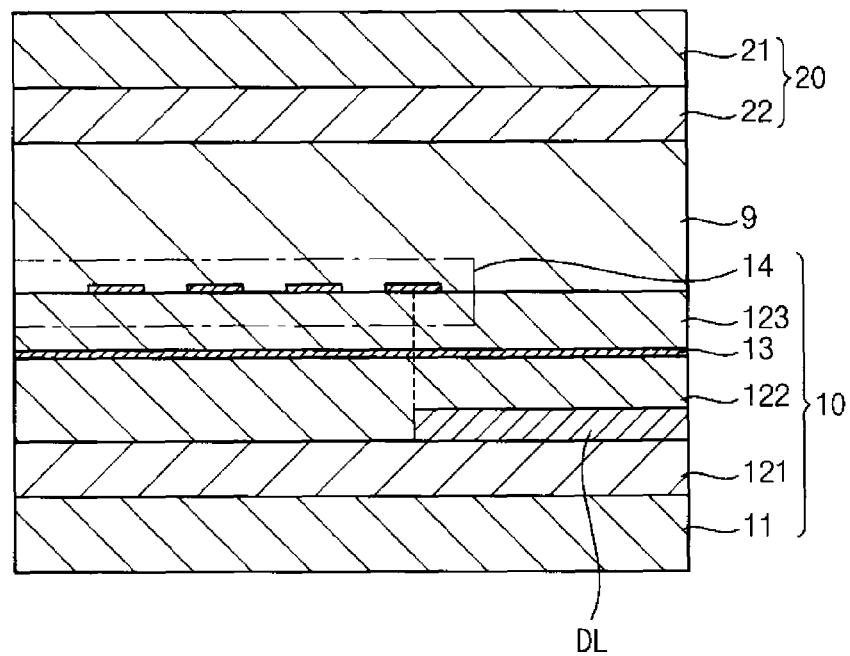
FIG. 11 is a cross-sectional view taken along line II-IF of FIG. 10.

FIG. 10 is a plan view illustrating another exemplary embodiment of a liquid crystal display apparatus according to the invention. FIG. 11 is a cross-sectional view taken along line II-II' of FIG. 10.

Referring to FIG. 10, an exemplary embodiment of the display part 6 according to the invention includes a pixel electrode 14, and a data line DL as a light shielding layer which partially overlaps the pixel electrode 14. The pixel electrode 14 may include a transparent conductive material, such as ITO. The pixel electrode 14 is a transparent electrode. The pixel electrode 14 includes a plurality of conductive patterns that are connected with one another at both of opposing ends of the conductive patterns. The pixel electrode 14 extends in a first direction and a second direction. The first direction is substantially parallel with a long axis of the gate line GL. The second direction is substantially parallel with a long axis of the data line DL. The conductive patterns are spaced apart from one another in the first direction. The conductive pattern is elongated to extend in the second direction. A slit is defined between adjacent conductive patterns. The slit is elongated to extend in the second direction. A plurality of the slits is spaced apart from one another in the first direction.

The pixel electrode 14 and a transistor TR are connected with each other through a contact part CONT. A common electrode 13 is disposed substantially on an entirety of the pixel electrode 14, and may be a layer disposed under the pixel electrode 14. The common electrode 13 may include a transparent conductive material, such as ITO. The common electrode 13 is a transparent electrode.

Referring to FIG. 11, the display part 6 includes a first substrate 10, a second substrate 20 and a liquid crystal layer 9. The first substrate 10 is an array substrate, and includes a first base substrate 11, a first insulation layer 121, a data line DL, a second insulation layer 122, a common electrode 13, a third insulation layer 123 and a pixel electrode 14 sequentially stacked on the first base substrate 11. In the illustrated exemplary embodiment, the data line DL acts as a light shielding layer. That is, the data line DL is partially overlapped with an outermost conductive pattern corresponding to an edge of the pixel electrode 14. In one exemplary embodiment, an end or edge of the data line DL is disposed at substantially a center of the outermost conductive pattern of the pixel electrode 14. Therefore, half of a width of the outermost conductive pattern of the pixel electrode 14 is overlapped with the data line DL. Where the data line DL is disposed on both of opposing ends or edges of the pixel electrode 14, the data line DL has two overlapped areas. That is, the data line DL effectively blocks a width of one conductive pattern, so that a number of conductive patterns of a pixel electrode and a number of slits between the conductive patterns are the same.

In exemplary embodiments of the invention, a total overlapped width of the pixel electrode 14 and the width of one conductive pattern are the same. Therefore, an end of the data line DL need not be disposed at a center of the outermost conductive pattern of the pixel electrode 14. In one exemplary embodiment, for example, when an overlapped width of a left outermost conductive pattern of the pixel electrode 14 by the data line DL is 30%, and an overlapped width of a right outermost conductive pattern of the pixel electrode 14 by the data line DL is 70%, a total overlapped width and the width of one conductive pattern are the same. Accordingly, a luminance difference of the positive frame and the negative frame may be minimized and the flicker may be minimized. When the flicker is, a high display quality of the liquid crystal display apparatus may be realized.

Figure 12:
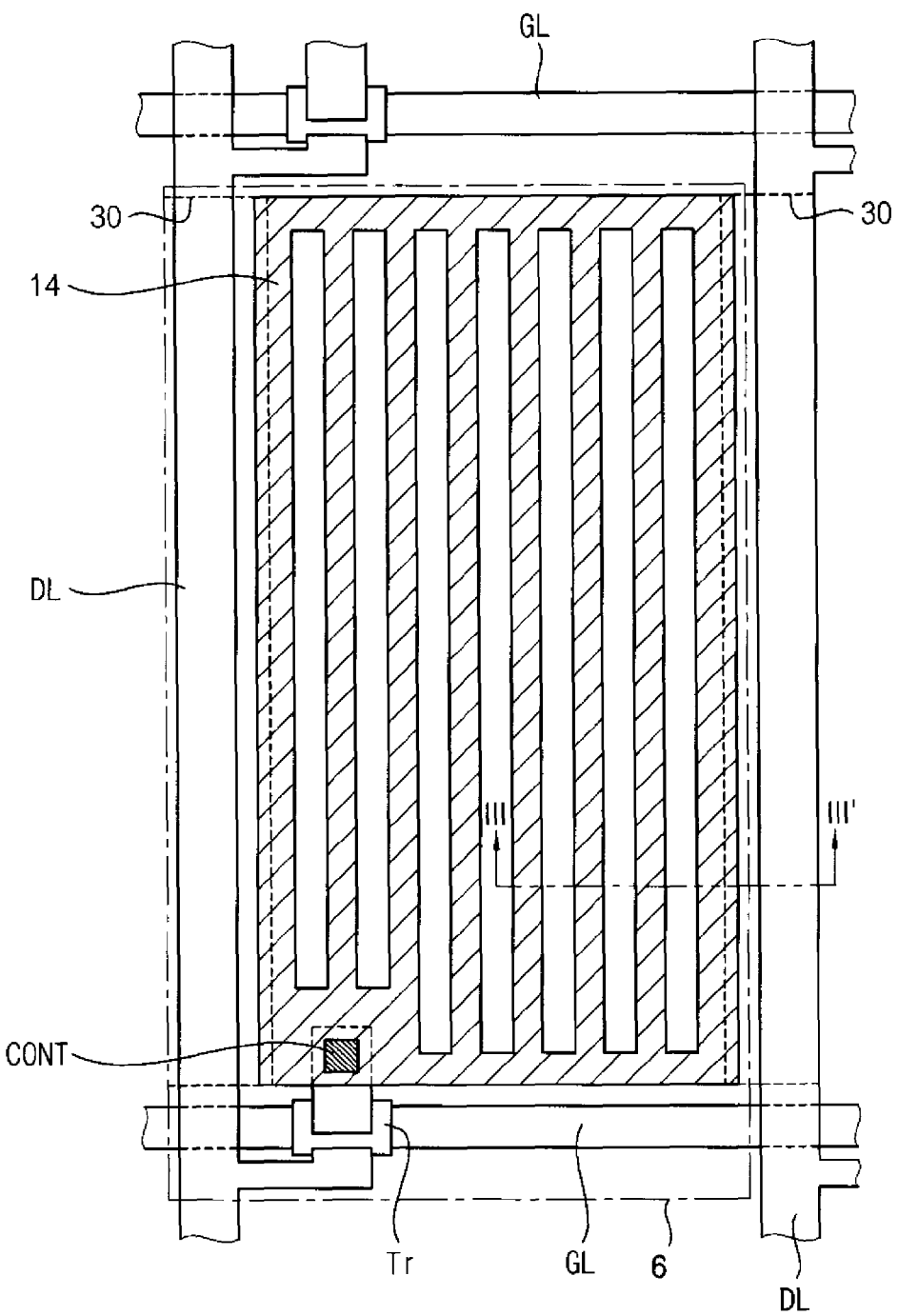
FIG. 12 is a plan view illustrating still another exemplary embodiment of a display part of a liquid crystal display apparatus according to the invention.
Figure 13:
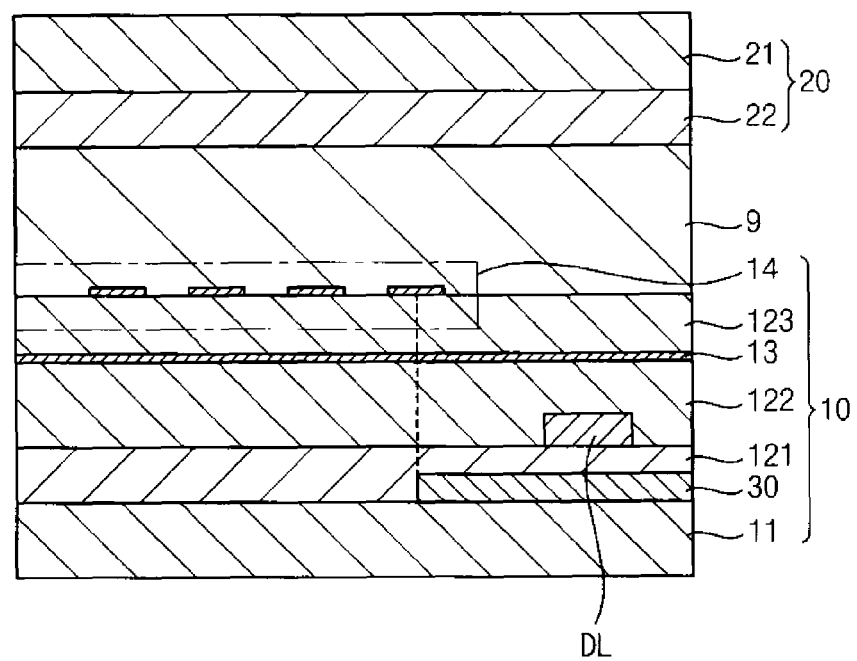
FIG. 13 is a cross-sectional view taken along line III-III' of FIG. 13.

FIG. 12 is a plan view illustrating still another exemplary embodiment of a liquid crystal display apparatus according to the invention. FIG. 13 is a cross-sectional view taken along line III-III' of FIG. 13.

Referring to FIG. 12, an exemplary the display part 6 according to the invention includes a pixel electrode 14, and a light shielding layer 30 which partially overlaps the pixel electrode 14. The pixel electrode 14 may include a transparent conductive material, such as ITO. The pixel electrode 14 is a transparent electrode and includes a plurality of conductive patterns connected with each other at both of opposing ends of the conductive patterns. The pixel electrode 14 extends in a first direction and a second direction. The first direction is substantially parallel with a long axis of the gate line GL. The second direction is substantially parallel with a long axis of the data line DL. The conductive patterns are spaced apart from one another in the first direction. The conductive pattern is elongated to extend in the second direction. A slit is defined between adjacent conductive patterns. The slit is elongated to extend in the second direction. A plurality of the slits is spaced apart from one another in first direction.

The pixel electrode 14 and a transistor TR are connected with each other through a contact part CONT. A common electrode 13 is disposed on substantially an entirety of the pixel electrode 14, and may be a layer disposed under the pixel electrode 14. The common electrode 13 may include a transparent conductive material, such as ITO. The common electrode 13 is a transparent electrode.

Referring to FIG. 13, the display part 6 includes a first substrate 10, a second substrate 20 and a liquid crystal layer 9. The first substrate 10 is an array substrate, and includes a first base substrate 11, a first insulation layer 121, the light shielding layer 30, a data line DL, a second insulation layer 122, a common electrode 13, a third insulation layer 123 and the pixel electrode 14 sequentially stacked on the first base substrate 11. In the illustrated exemplary embodiment, the light shielding layer 30 and the gate line GL are in and/or on a same layer of the display panel and/or the liquid crystal display apparatus. The light shielding layer 30 and the gate line GL include the same material. In one exemplary embodiment, an end or edge of the light shielding layer 30 is disposed at substantially a center of the outermost conductive pattern of the pixel electrode 14. Therefore, half of a width of the outermost conductive pattern of the pixel electrode 14 is overlapped with the light shielding layer 30. Where the light shielding layer 30 is disposed on both of opposing ends or edges of the pixel electrode 14, the light shielding layer 30 has two overlapped area. That is, the light shielding layer 30 effectively blocks a width of one conductive pattern, so that a number of conductive patterns of a pixel electrode and a number of a slit between the conductive patterns are the same.

In exemplary embodiments of the invention, a total overlapped width of the pixel electrode 14 and the width of one conductive pattern are the same. Therefore, an end of the light shielding layer 30 need not be disposed at a center of the outermost conductive pattern of the pixel electrode 14. In one exemplary embodiment, for example, when an overlapped width of a left outermost conductive pattern of the pixel electrode 14 by the light shielding layer 30 is 30%, and an overlapped width of a right outermost conductive pattern of the pixel electrode 14 by the light shielding layer 30 is 70%, a total overlapped width and the width of one conductive pattern are the same. Accordingly, a luminance difference of the positive frame and the negative frame may be minimized and the flicker may be minimized. When the flicker is minimized, a high display quality of the liquid crystal display apparatus may be realized.

Figure 14:
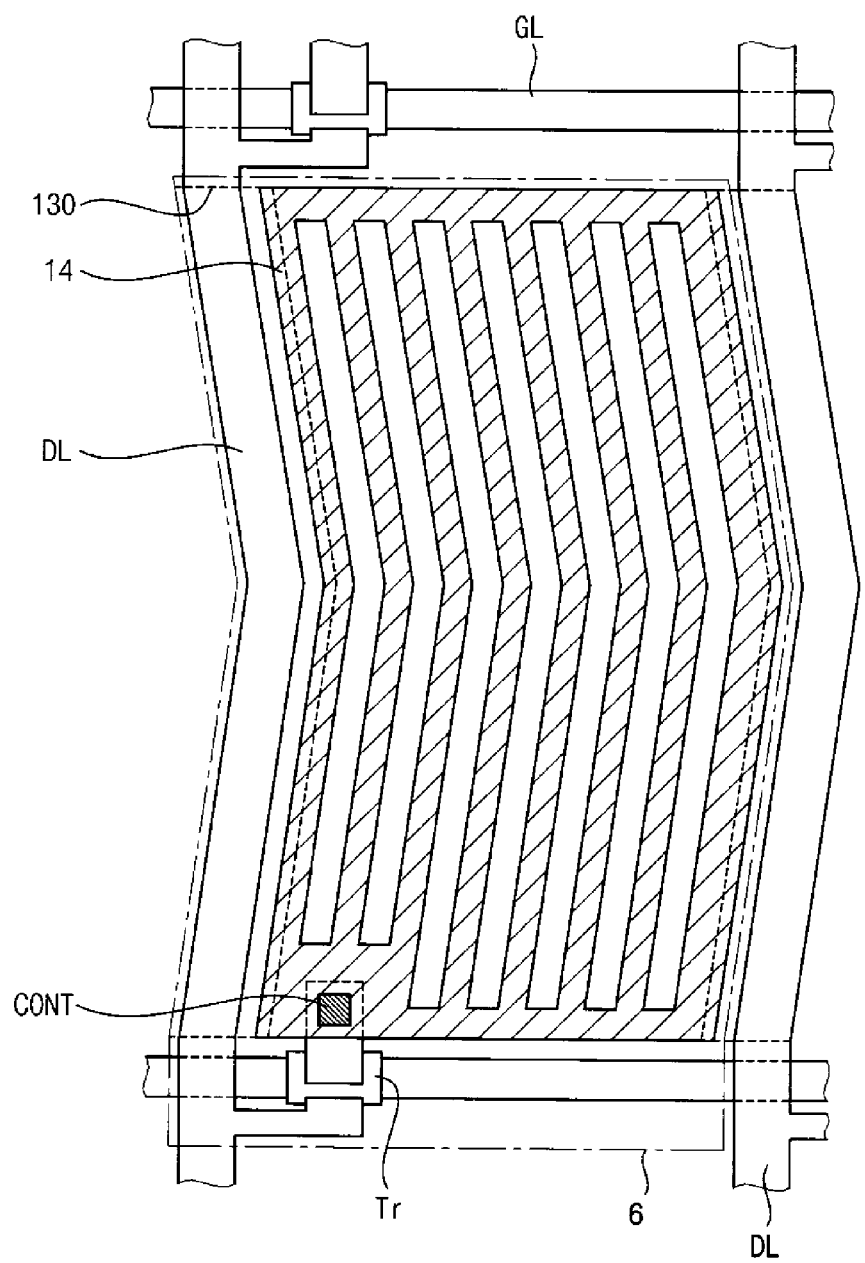
FIG. 14 is a plan view illustrating yet another exemplary embodiment of a display part of a liquid crystal display apparatus according to the invention.

FIG. 14 is a plan view illustrating yet another exemplary embodiment of a liquid crystal display apparatus according to the invention.

Referring to FIG. 14, an exemplary the display part 6 according to the invention includes a pixel electrode 14, and a light shielding layer 130 which partially overlaps the pixel electrode 14. In the illustrated exemplary embodiment, the pixel electrode 14 may include a plurality of bent conductive patterns. The pixel electrode 14 may include a transparent conductive material, such as ITO. The pixel electrode 14 is a transparent electrode, and includes the plurality of bent conductive patterns connected with each other at both of opposing ends of the bent conductive patterns. The pixel electrode 14 extends in a first direction and a second direction. The first direction is substantially parallel with a long axis of the gate line GL. The second direction is substantially parallel with a long axis of the data line DL. The bent conductive patterns are spaced apart from one another in the first direction. The bent conductive pattern is elongated to extend in the second direction.

Since the conductive patterns of the pixel electrode 14 have a bent shape, the light shielding layer 130 has a corresponding bent shape. Edges of the light shielding layer 130 are substantially parallel to corresponding edges of the conductive patterns. Other elements are substantially the same as elements of FIG. 3. Thus, the same reference numerals will be used to refer to the same or like parts as those described in FIG. 3 and any further explanation will be omitted.

According to one or more exemplary embodiment of the invention, an end or edge of a light shielding layer is disposed at substantially a center of the outermost conductive pattern of the pixel electrode 14. Therefore, approximately half of a width of the outermost conductive pattern of the pixel electrode 14 is overlapped by the light shielding layer.

Where the light shielding layer is disposed on both of opposing ends or edges of the pixel electrode 14, the light shielding layer overlaps two areas of the pixel electrode 14 at outermost conductive patterns thereof. That is, the light shielding layer blocks a width of one conductive pattern, so that a number of conductive patterns of a pixel electrode and a number of slits between the conductive patterns are the same.

In one or more exemplary embodiment of the invention, a total overlapped width and the width of one conductive pattern are the same. Therefore, an end or edge of the light shielding layer need not be disposed at a center of the outermost conductive pattern of the pixel electrode 14. In one exemplary embodiment, for example, when an overlapped width of a left outermost conductive pattern of the pixel electrode 14 by the light shielding layer is 30%, and an overlapped width of a right outermost conductive pattern of the pixel electrode 14 by the light shielding layer is 70%, a total overlapped width and the width of one conductive pattern are the same. Accordingly, a luminance difference of the positive frame and the negative frame may be minimized and the flicker may be minimized. When the flicker is minimized, a high display quality of the liquid crystal display apparatus may be realized.

In addition, the light shielding layer blocks an outer area of an electrode, so that the afterimage may be minimized. Therefore, a display quality of the liquid crystal display apparatus may be improved.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A liquid crystal display apparatus comprising:
    a first substrate;
    a first electrode on the first substrate;
    a second electrode overlapping the first electrode, and comprising a plurality of conductive patterns elongated in a first direction and spaced apart from each other in a second direction which crosses the first direction; and
    a light shielding layer, in the second direction, overlapping outermost conductive patterns of the second electrode at opposing sides of the second electrode in the second direction,
    wherein along a total first direction length of the outermost conductive patterns overlapped by the light shielding layer at the opposing sides of the second electrode, a total overlapped second direction width of the outermost conductive patterns overlapped by the light shielding layer at the opposing sides of the second electrode is the same as a second direction width of a single one conductive pattern among the plurality of conductive patterns.

2. The liquid crystal display apparatus of claim 1, further comprising an insulation layer between the first electrode and the second electrode,
    wherein the first electrode comprises a common electrode, and the second electrode comprises a pixel electrode.

3. The liquid crystal display apparatus of claim 2, wherein the pixel electrode and the insulation layer satisfy the following Equation:

$-0.16 \times T + 0.38 \leq L/P \leq -0.16 \times T + 0.48$, wherein T is a cross-sectional thickness of the insulation layer, L is the second direction width of the single one conductive pattern, and P is a pitch of the conductive patterns defined as a distance between centers of two adjacent conductive patterns.

4. The liquid crystal display apparatus of claim 3, further comprising a data line on the first substrate,
    wherein the light shielding layer comprises the data line.

5. The liquid crystal display apparatus of claim 3, further comprising a gate line on the first substrate,
    wherein the light shielding layer and the gate line comprise a same material.

6. The liquid crystal display apparatus of claim 5, wherein the light shielding layer and the gate line are in a same layer.

7. The liquid crystal display apparatus of claim 1, further comprising a second substrate facing the first substrate, and comprising a color filter,
    wherein the light shielding layer is on the second substrate.

8. The liquid crystal display apparatus of claim 7, wherein the light shielding layer comprises a black matrix.

9. The liquid crystal display apparatus of claim 1, wherein an edge of the light shielding layer overlapping an outermost conductive pattern among the outermost conductive patterns corresponds to a center line elongated in the first direction and passing through a center of the outermost conductive pattern in a plan view.

10. A liquid crystal display apparatus comprising:
    a first substrate;
    a first electrode on the first substrate;
    a second electrode overlapping the first electrode, and comprising a plurality of bent conductive patterns elongated in a first direction and spaced apart from each other in a second direction which crosses the first direction; and
    a light shielding layer, in the second direction, overlapping outermost conductive patterns of the second electrode at opposing sides of the second electrode in the second direction,
    wherein along a total first direction length of the outermost conductive patterns overlapped by the light shielding layer at the opposing sides of the second electrode, a total overlapped second direction width of the outermost conductive patterns overlapped by the light shielding layer at the opposing sides of the second electrode is the same as a second direction width of a single one conductive pattern among the plurality of conductive patterns.

11. The liquid crystal display apparatus of claim 10, further comprising an insulation layer between the first electrode and the second electrode,
    wherein the first electrode comprises a common electrode, and the second electrode comprises a pixel electrode.

12. The liquid crystal display apparatus of claim 11, wherein the pixel electrode and the insulation layer satisfy the following Equation:

$-0.16 \times T + 0.38 \leq L/P \leq -0.16 \times T + 0.48$, wherein T is a cross-sectional thickness of the insulation layer, L is the second direction width of the single one conductive pattern, and P is a pitch of the conductive patterns defined as a distance between centers of two adjacent conductive patterns.

13. The liquid crystal display apparatus of claim 12, further comprising a data line on the first substrate,
    wherein the light shielding layer comprises the data line.

14. The liquid crystal display apparatus of claim 12, further comprising a gate line on the first substrate,
    wherein the light shielding layer and the gate line comprise a same material.

15. The liquid crystal display apparatus of claim 14, wherein the light shielding layer and the gate line are in a same layer.

16. The liquid crystal display apparatus of claim 10, further comprising a second substrate facing the first substrate, and comprising a color filter,
wherein the light shielding layer is on the second substrate.

17. The liquid crystal display apparatus of claim 16, wherein the light shielding layer comprises a black matrix.

18. The liquid crystal display apparatus of claim 10, wherein an edge of the light shielding layer overlapping an outermost conductive pattern among the outermost conductive patterns corresponds to a center line elongated in the first direction and passing through a center of the outermost conductive pattern in a plan view.

* * * * *